United States Patent
Plank et al.

(10) Patent No.: US 11,287,528 B2
(45) Date of Patent: Mar. 29, 2022

(54) METHOD AND APPARATUS FOR DETERMINING RELATIVE MOTION BETWEEN A TIME-OF-FLIGHT CAMERA AND AN OBJECT IN A SCENE SENSED BY THE TIME-OF-FLIGHT CAMERA

(71) Applicant: Infineon Technologies AG, Neubiberg (DE)

(72) Inventors: Hannes Plank, Graz (AT); Armin Schoenlieb, Seiersberg-Pirka (AT)

(73) Assignee: Infineon Technologies AG, Neubiberg (DE)

( * ) Notice: Subject to any disclaimer, the term of this patent is extended or adjusted under 35 U.S.C. 154(b) by 0 days.

(21) Appl. No.: 16/932,117

(22) Filed: Jul. 17, 2020

(65) Prior Publication Data

US 2021/0018627 A1    Jan. 21, 2021

(30) Foreign Application Priority Data

Jul. 18, 2019 (EP) ..................... 19186982

(51) Int. Cl.
*H04N 7/18* (2006.01)
*G01S 17/50* (2006.01)
(Continued)

(52) U.S. Cl.
CPC .............. *G01S 17/50* (2013.01); *G01S 7/497* (2013.01); *G01S 17/894* (2020.01); *G06T 7/246* (2017.01);
(Continued)

(58) Field of Classification Search
CPC ........ G01S 17/50; G01S 17/894; G01S 7/497; G01S 17/36; G01S 17/74; G01S 11/12;
(Continued)

(56) References Cited

U.S. PATENT DOCUMENTS

2012/0092485 A1* 4/2012 Meinherz .............. G01S 7/4802
348/91
2016/0041264 A1* 2/2016 Dielacher ............... G01S 17/10
356/5.01
(Continued)

FOREIGN PATENT DOCUMENTS

DE  102017105142 A1  9/2018
JP     2003344541 A  12/2003

*Primary Examiner* — Shan E Elahi
(74) *Attorney, Agent, or Firm* — Murphy, Bilak & Homiller, PLLC (57) ABSTRACT

A method for determining relative motion between a time-of-flight camera and an object in a scene sensed by the time-of-flight camera is provided. The method includes receiving at least two sets of raw images of the scene from the time-of-flight camera, each set including at least one raw image. The raw images are based on correlations of a modulated reference signal and measurement signals of the time-of-flight camera. The measurement signals are based on a modulated light signal emitted by the object. The method includes determining, for each set of raw images, a value indicating a respective phase difference between the modulated light and reference signals based on the respective set of raw images, and determining information about relative motion between the time-of-flight camera and object based on the values indicating the phase differences. The method includes outputting the information about relative motion between the time-of-flight camera and the object.

13 Claims, 4 Drawing Sheets

(51) Int. Cl.
  *G06T 7/579* (2017.01)
  *G06T 7/521* (2017.01)
  *G06T 7/246* (2017.01)
  *G01S 17/894* (2020.01)
  *G01S 7/497* (2006.01)
  *H04N 5/225* (2006.01)

(52) U.S. Cl.
  CPC .............. *G06T 7/521* (2017.01); *G06T 7/579* (2017.01); *H04N 5/2256* (2013.01); *G06T 2207/10028* (2013.01)

(58) Field of Classification Search
  CPC ...... G01S 17/58; G01S 7/4802; G01S 7/4913; G01S 17/32; G06T 7/579; G06T 7/521; G06T 7/246; G06T 2207/10028; H04N 5/2256
  USPC ......................................................... 348/135
  See application file for complete search history.

(56) References Cited

U.S. PATENT DOCUMENTS

| | | | |
|---|---|---|---|
| 2018/0130255 A1* | 5/2018 | Hazeghi | H04N 13/239 |
| 2018/0259628 A1* | 9/2018 | Plank | G01S 7/4865 |
| 2019/0079192 A1* | 3/2019 | Fenton | G01S 17/36 |
| 2019/0082110 A1* | 3/2019 | Jin | H04N 5/23287 |

* cited by examiner

METHOD AND APPARATUS FOR DETERMINING RELATIVE MOTION BETWEEN A TIME-OF-FLIGHT CAMERA AND AN OBJECT IN A SCENE SENSED BY THE TIME-OF-FLIGHT CAMERA

TECHNICAL FIELD

Examples relate to Time-of-Flight (TOF) sensing. In particular, examples relate to a method and an apparatus for determining relative motion between a ToF camera and an object in a scene sensed by the ToF camera.

BACKGROUND

In various applications, ToF sensors measure distances to electronic devices. ToF sensors are limited in range and image (frame) rate, which limits the ToF sensors capability to sense motion of an object relative to the ToF sensor.

SUMMARY

Hence, there may be a demand for an improved technique for determining relative motion between a ToF camera and an object.

An example relates to a method for determining relative motion between a ToF camera and an object in a scene sensed by the ToF camera. The object emits a modulated light signal. The method comprises receiving at least two sets of raw images of the scene from the ToF camera. The raw images are based on correlations of a modulated reference signal and measurement signals of the ToF camera. The at least two sets of raw images each comprise at least one raw image. The measurement signals are based on the modulated light signal emitted by the object. Further, the method comprises determining for each set of raw images a value indicating a respective phase difference between the modulated light signal and the modulated reference signal based on the respective set of raw images. The method additionally comprises determining information about relative motion between the ToF camera and the object based on the values indicating the phase differences. Further, the method comprises outputting the information about relative motion between the ToF camera and the object.

Another example relates to an apparatus for determining relative motion between a ToF camera and an object in a scene sensed by the ToF camera. The object emits a modulated light signal. The apparatus comprises an input circuit configured to receive multiple sets of raw images of the scene from the ToF camera. The at least two sets of raw images each comprise at least one raw image. The raw images are based on correlations of a modulated reference signal and measurement signals of the ToF camera. The measurement signals are based on the modulated light signal emitted by the object. The apparatus additionally comprises a processing circuit configured to determine for each set of raw images a value indicating a respective phase difference between the modulated light signal and the modulated reference signal based on the respective set of raw images. The processing circuit is additionally configured to determine information about relative motion between the ToF camera and the object based on the values indicating the phase differences. Further, the apparatus comprises an output circuit configured to output the information about relative motion between the ToF camera and the object.

BRIEF DESCRIPTION OF THE FIGURES

Some examples of apparatuses and/or methods will be described in the following by way of example only, and with reference to the accompanying figures, in which.

DETAILED DESCRIPTION

Various examples will now be described more fully with reference to the accompanying drawings in which some examples are illustrated. In the figures, the thicknesses of lines, layers and/or regions may be exaggerated for clarity.

Accordingly, while further examples are capable of various modifications and alternative forms, some particular examples thereof are shown in the figures and will subsequently be described in detail. However, this detailed description does not limit further examples to the particular forms described. Further examples may cover all modifications, equivalents, and alternatives falling within the scope of the disclosure. Same or like numbers refer to like or similar elements throughout the description of the figures, which may be implemented identically or in modified form when compared to one another while providing for the same or a similar functionality.

It will be understood that when an element is referred to as being "connected" or "coupled" to another element, the elements may be directly connected or coupled via one or more intervening elements. If two elements A and B are combined using an "or", this is to be understood to disclose all possible combinations, i.e. only A, only B as well as A and B, if not explicitly or implicitly defined otherwise. An alternative wording for the same combinations is "at least one of A and B" or "A and/or B". The same applies, mutatis mutandis, for combinations of more than two Elements.

The terminology used herein for the purpose of describing particular examples is not intended to be limiting for further examples. Whenever a singular form such as "a", "an" and "the" is used and using only a single element is neither explicitly or implicitly defined as being mandatory, further examples may also use plural elements to implement the same functionality. Likewise, when a functionality is subsequently described as being implemented using multiple elements, further examples may implement the same functionality using a single element or processing entity. It will be further understood that the terms "comprises", "comprising", "includes" and/or "including", when used, specify the presence of the stated features, integers, steps, operations, processes, acts, elements and/or components, but do not preclude the presence or addition of one or more other features, integers, steps, operations, processes, acts, elements, components and/or any group thereof.

Unless otherwise defined, all terms (including technical and scientific terms) are used herein in their ordinary meaning of the art to which the examples belong.

Figure 1:
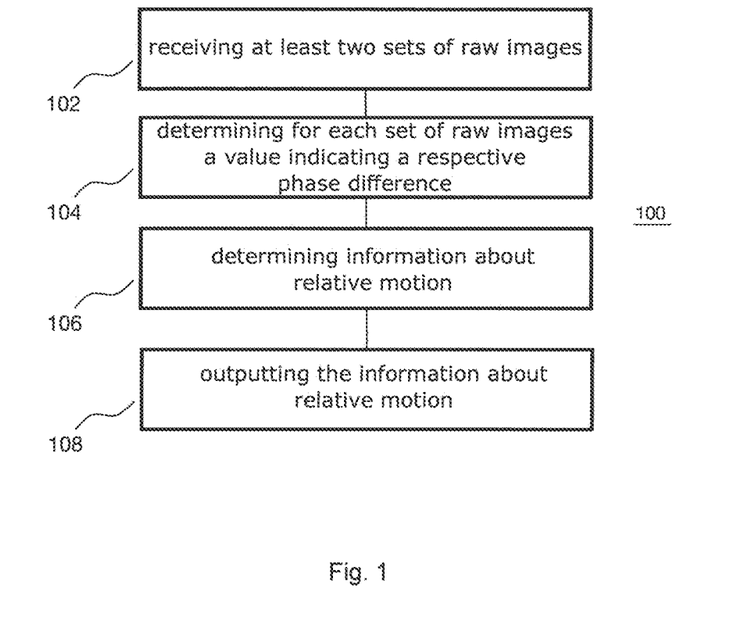
FIG. 1 illustrates a flowchart of an example of a method for determining relative motion between a ToF camera and an object in a scene sensed by the ToF camera.

FIG. 1 illustrates a flowchart of a method 100 for determining relative motion between a ToF camera and an object in a scene sensed by the ToF camera. Prior to describing method 100 in detail, some basics of conventional ToF depth measurement will introductorily be described in the following paragraphs for pedagogical reasons with respect to FIG. 2.

Figure 2:
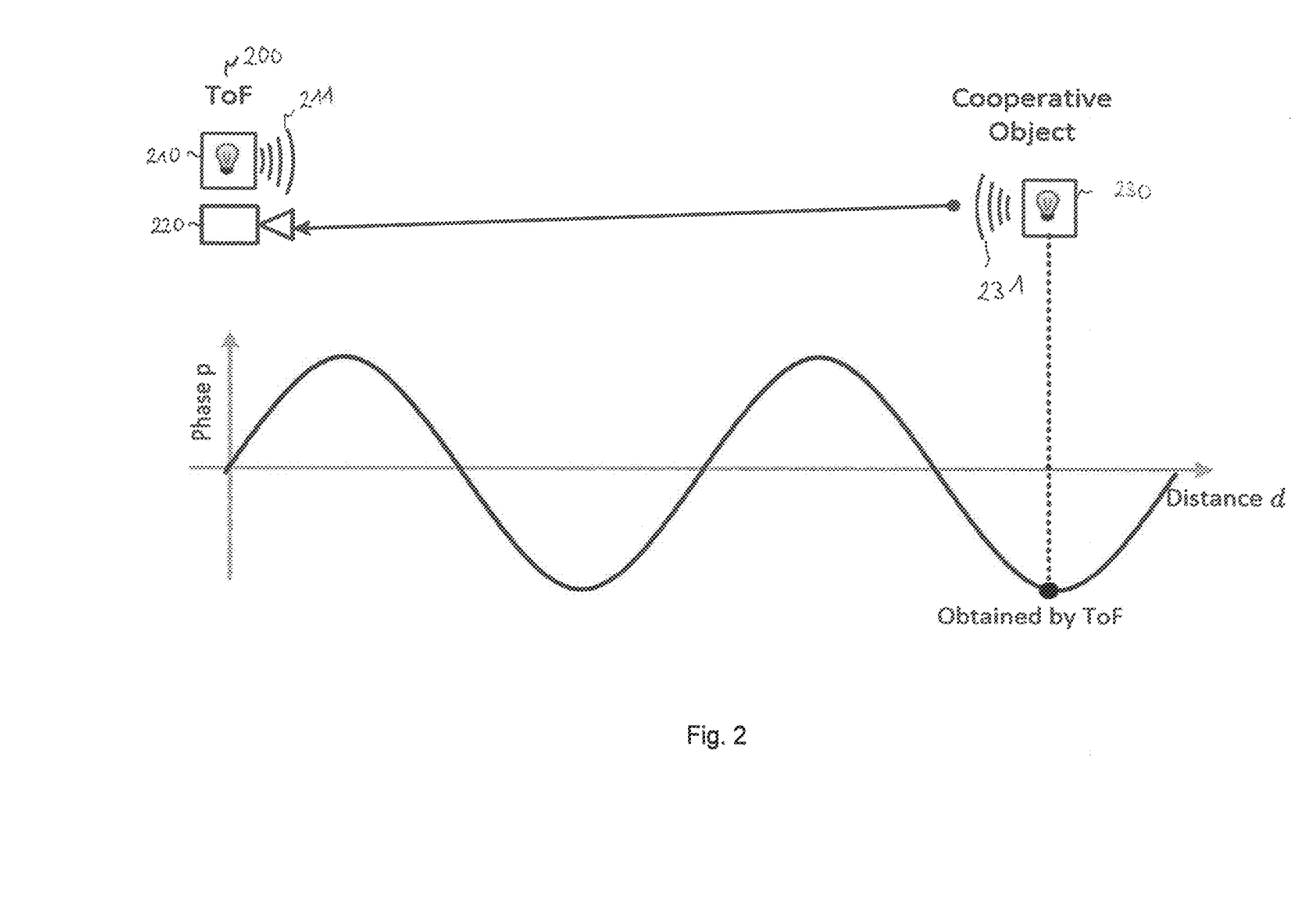
FIG. 2 illustrates an example of a ToF camera sensing an object.

A ToF camera 200 comprises an illumination element 210 for illuminating the scene with modulated light 211 (e.g. infrared light). The illumination element 210 generates the modulated light 211 based on a (electric) modulated reference signal such as a continuous wave modulated signal (e.g. by controlling one or more Light-Emitting Diodes, LEDs, or one or more laser diodes based on the modulated reference signal). An object 230 in the scene that is illuminated by the modulated light 211 reflects at least part of the modulated light 211 back to a light capturing element 220 (e.g. comprising optics, an image sensor and driver electronics) of the ToF camera 200. In other words, in conventional ToF sensing, the light capturing element 220 receives reflected light from the object 230.

The image sensor of the light capturing element 220 is pixelated and each pixel measures a fraction of the reflected light. Accordingly, (electric) measurement signals based on the reflected light from the scene are generated. For example, each pixel may comprise a Photonic Mixer Device (PMD) for measuring the reflected light.

Depending on the distance $d_{obj}$ between the ToF camera 200 and the object 230, i.e. depending on the depth, the reflected light exhibits a delay with respect to the emission of the modulated light 211. Accordingly, the measurement signals experience distance dependent (depth dependent) phase shifts with respect to the modulated reference signal.

The modulated reference signal and the measurement signal of the respective pixel are correlated according to a (auto)correlation function $c(\delta+\varphi_d)$ in order to obtain a correlation value L for each pixel. The correlation function $c(\delta+\varphi_d)$ mimics a phase-distance function describing the relation between the distance $d_{obj}$ and the phase between the modulated reference signal and the measurement signal.

The output of the correlation function $c(\delta+\varphi_d)$ is the correlation value L for each pixel. The determined correlation values L are then combined to a raw image (sometimes also referred to as "phase image"). That is, the raw image comprises a plurality of pixels each representing a corresponding correlation value L. Each of the correlation values indicates a respective phase difference between the reflected light (represented by the respective measurement signal) and the modulated reference signal. For example, if PMDs are used for measuring the reflected light, the steps of generating the measurement signals and correlating the measurement signals with the modulated reference signal may be combined to a single step.

In order to sample the correlation function $c(\delta+\varphi_d)$, plural raw images are generated. A phase offset δ between the modulated reference signal and the measurement signals as used for the correlations varies between the individual raw images. In other words, different phase offsets δ are used for correlating the modulated signal and the measurement signals in order to obtain the individual raw images.

Sampling the same object at the same distance and exhibiting the same reflectivity enables to sample the correlation function $c(\delta+\varphi_d)$. For example, phase offsets of 0°, 90°, 180° and 270° may be used to generate four raw images each comprising a plurality of pixels that represent corresponding correlation values $L_{0°}$, $L_{90°}$, $L_{180°}$ and $L_{270°}$.

For the correlation value $L_{0°}$, the correlation function $c(\delta+\varphi_d)$ is shifted by the distance dependent phase shift $\varphi_d$ between the measurement signal and the modulated reference signal of the pixel with respect to the zero value of the function's argument.

Using the four correlation values $L_{0°}$, $L_{90°}$, $L_{180°}$ and $L_{270°}$ that sample the correlation function $c(\delta+\varphi_d)$, the phase shift (phase angle) $\varphi_d$ may be determined as follows:

$$\varphi_d = \mathrm{atan2}\left(\frac{L_{90°} - L_{270°}}{L_{0°} - L_{180°}}\right) \tag{1}$$

Taking into account the speed of light c and the modulation frequency $f_p$ of the emitted light 211 (i.e. the modulation frequency of the modulated reference signal), the distance $d_{obj}$ to the object 230, i.e., the depth, may be calculated as follows:

$$d_{obj} = \frac{c}{2} \cdot \frac{\varphi d}{2\pi \cdot f_p} \tag{2}$$

In contrast to conventional ToF depth sensing as described above, the object 230 actively emits a modulated light 231 in method 100—the ToF camera 200 does not illuminate the scene for determining relative motion between the ToF camera 200 and the object 230. That is, the light received by the capturing element 220 of the ToF camera is the modulated light 231 which is actively emitted by the object 230. The modulated light 231 may, e.g., be an infrared signal, which is emitted by one or more LEDs or laser diodes of the object 230.

Method 100 comprises receiving 102 at least two sets of raw images of the scene comprising the object 230 from the ToF camera 200. The at least two sets of raw images each comprise at least one raw image. In other words, each of the received sets of raw images comprises one or more raw images (e.g. 2, 4, 8, or 16 raw images). Similar to what is described above, the raw images are based on correlations of the modulated reference signal and the measurement signals of the capturing element 220 of the ToF camera 200. Accordingly, the measurement signals are based on the modulated light signal 231 emitted by the object 230. Therefore, the (correlation) values represented by the pixels of the one or more raw images of each set of raw images indicate a respective phase difference the modulated light signal and the modulated reference signal. For example, two phase images with phase offsets δ of 0° and 90° may be taken, or four phase images with equidistant phase offset δ may be taken. The time difference(s) between the capture times of the individual raw images within the respective sets of raw images may be smaller than a time difference between two immediately succeeding raw images belonging to different sets of raw images (e.g. a last raw image of a first set of raw images and the first raw image of a immediately following second set of raw images). Accordingly, the sets of raw images characterize positions of the object 230 relative to the ToF camera at different time instances.

Further, method 100 comprises determining 104 for each set of raw images a value indicating a respective phase difference between the modulated light signal and the modulated reference signal based on the respective set of raw images. That is, for the first set of raw images of the at least two sets of raw images, a first value indicating a first phase difference between the modulated light signal and the modulated reference signal is determined based on only the one or more raw images of the first set of raw images, whereas for the second set of raw images of the at least two sets of raw images, a second value indicating a second phase difference between the modulated light signal and the modulated reference signal is determined based on only the one or more raw images of the second set of raw images.

The step of determining 104 a respective value indicating the phase difference between the modulated light signal and the modulated reference signal for one of the at least two sets of raw images may, e.g., comprise applying a calibration correction and/or an error correction to the values indicated by the pixels of the one or more raw images of the respective set of raw images. For example, the one or more raw images of the respective set of raw images may be corrected for fixed patterns, temperature variations, wiggling, etc.

If one of the sets of raw images comprises more than one raw image, the step of determining 104 a respective value indicating the phase difference between the modulated light signal and the modulated reference signal for the one set of raw images may alternatively or additionally comprise combining die phase information contained in the individual raw images of the one set of raw images. For example, the value indicating the phase difference between the modulated light signal and the modulated reference signal may be determined according to above expression (1), wherein the correlation values in expression (1) may be the unmodified correlation values of the raw images or be calibration and/or error corrected correlation values.

Method 100 additionally comprises determining 106 information about relative motion between the ToF camera 200 and the object 230 based on the values indicating the phase differences.

In other words, the ToF camera continuously captures the phase difference by capturing sets of single or multiple raw images. Changes in the phase difference can be translated to relative motion taking into account the speed of light c and the modulation frequency $f_p$ of the modulated reference signal:

$$\Delta d_{obj} = \frac{c}{2} \cdot \frac{\Delta p}{2\pi \cdot f_p}, \quad (3)$$

with $\Delta p$ denoting the difference between the values indicating the phase differences for two consecutive (e.g. directly succeeding) sets of raw images, and $\Delta d_{obj}$ denoting the relative distance change between the ToF camera 200 and the object 230 between the capture times of the two consecutive sets of raw images.

Similarly, a relative motion speed $\Delta v_{obj}$ between the ToF camera 200 and the object 230 may be determined:

$$\Delta v_{obj} = \frac{c}{2} \cdot \frac{\Delta p}{2\pi \cdot f_p \cdot \Delta t}, \quad (4)$$

with $\Delta t$ denoting the time difference between the capture times of the two consecutive sets of raw images.

Therefore, the information about relative motion between the ToF camera 200 and the object 230 may indicate at least one of the relative distance change $\Delta d_{obj}$ or the relative speed $\Delta v_{obj}$ between the ToF camera 200 and the object 230.

Further, method 100 comprises outputting 108 the information about relative motion between the ToF camera 200 and the object 230. For example, an image comprising a plurality of pixels that indicate the motion between the ToF camera 200 and the object 230 may be output. Alternatively or additionally, a stream or an array of values indicating the motion between the ToF camera 200 and the object 230 may be output.

Method 100 may enable to measure relative motion (e.g. relative distance changes) between the ToF camera 200 and the modulated light source 230. In other words, method 100 uses the ToF camera 200 and the object 230 in a cooperative manner by equipping the object 230 with an active illumination unit. The ToF camera 200 is able to sample the modulated light signal 231 of the cooperative object 230 over wide distance ranges with shorter exposure times compared to conventional ToF depth sensing. Since the ToF camera 200 does not need to emit light, the sample rate may be improved (increased) without regards to eye-safety. Even though method 100 in its most basic implementations may not allow to determine an absolute distance between the ToF camera 200 and the object 230, it may allow to measure relative motion between the ToF camera 200 and the object 230.

In order to be able to correctly determine the respective values indicating the phase differences, the modulation frequency of the modulated reference signal used by the light capturing element 220 of the ToF camera 200 is to be synchronized to a modulation frequency of the modulated light signal 231 emitted by the object 230. Therefore, method 100 additionally comprises controlling the ToF camera 200 to synchronize the modulation frequency of the modulated reference signal to the modulation frequency of the modulated light signal 231 emitted by the object 230. In other words, the ToF camera uses a synchronization mechanism to approximate its pixel modulation clock to the frequency of the modulated light signal 231 emitted by the object 230.

Perfect synchronization is not possible in practice so that the modulation frequencies of the modulated reference signal used by the ToF camera 200 and the modulated light signal 231 emitted by the object 230 may differ (e.g. by a few Hz). For being able to measure relative distance changes, the synchronization error needs to be compensated. This is exemplarily illustrated in FIG. 3 depicting the phasors $p_1$ and $p_2$ for two consecutive sets of raw images.

A phasor (also known as phase vector) is a complex number representing a ToF measurement. The phasor consists of an angle describing the (depth/distance dependent) phase shift of a measurement signal measured by the ToF camera's light capturing element with respect to the modulated reference signal. Further, the phasor consists of a length describing the intensity of the measurement signal, i.e. the measured intensity of the measured light. Since the angle of the phase is depth/distance dependent, sensing an object at different distances with respect to the ToF camera rotates the phasor.

Figure 3:
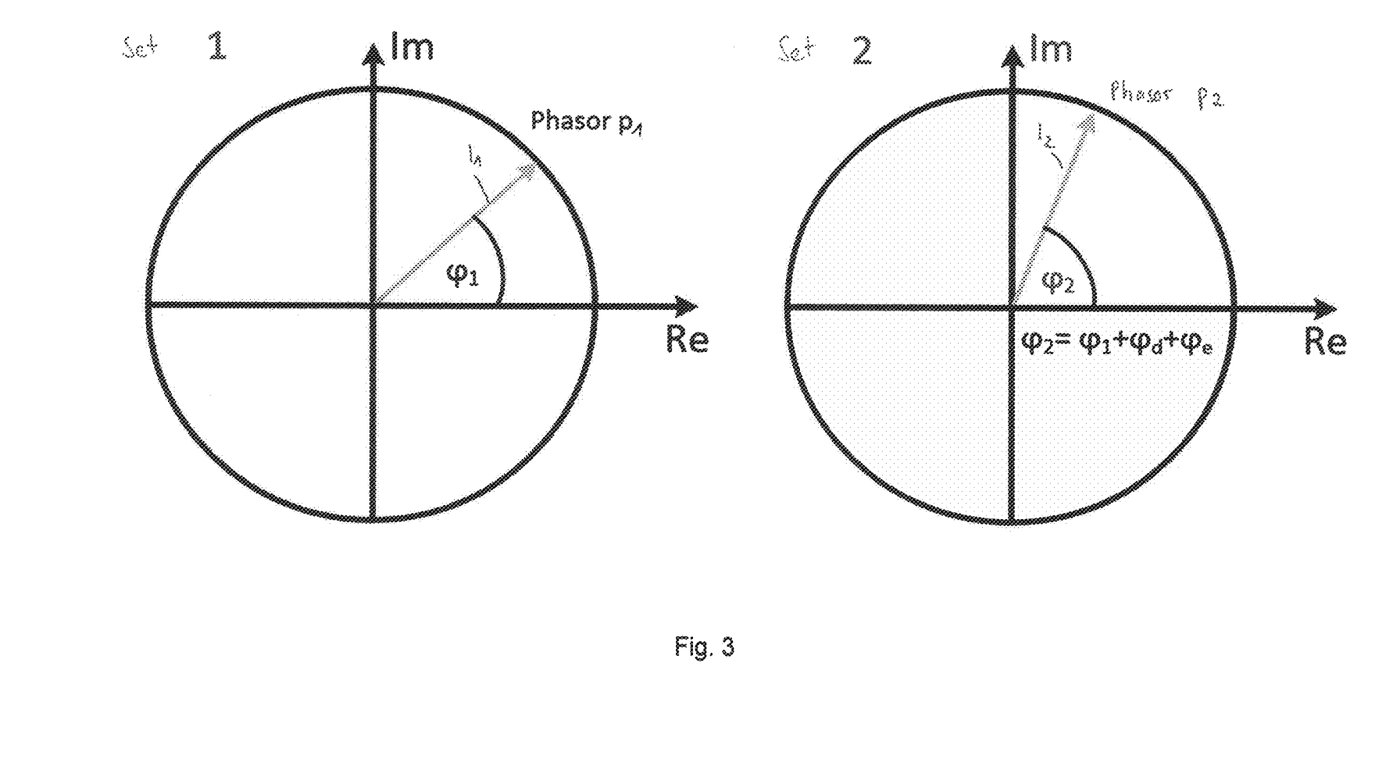
FIG. 3 illustrates two exemplary phasors.

The left part of FIG. 3 illustrates the phasor $p_1$ for a first set of raw images. The phasor $p_1$ exhibits an intensity $I_1$ and an angle $\varphi_1$. The right part of FIG. 3 illustrates the phasor $p_2$ for a consecutive second set of raw images. The phasor $p_2$ exhibits an intensity $I_2$ and an angle $\varphi_2$.

The time span $\Delta t$ lapses between the capture of the first set of raw images and the capture of the second set of raw images. As described above, movement of the object 230 causes the phasor to rotate. Further, the synchronization error of the modulation frequency of the modulated reference signal used by the ToF camera 200 with respect to the modulation frequency of the modulated light signal 231 emitted by the object 230 causes the phasor to rotate. In terms of a mathematical expression, this may be expressed as follows:

$$\varphi_2 = \varphi_1 + \varphi_d + \varphi_e \quad (5),$$

with $\varphi_d$ denoting the phase shift caused by the relative motion between the ToF camera 200 and the object 230, and $\varphi_e$ denoting the phase shift caused by the synchronization error of the modulation frequency of the modulated reference signal used by the ToF camera 200.

In order to obtain the correct phase $\varphi_{2,corr}$ for the consecutive second set of raw images, the phase shift $\varphi_e$ caused by the synchronization error ($\varphi_e$ may, hence, be understood as a phase error) is to be subtracted from the measured phase $\varphi_2$:

$$\varphi_{2,corr} = \varphi_2 - \varphi_e \quad (6)$$

The phase error $\varphi_e$ (e.g. in radiant) is caused by the synchronization error $f_{error}$ (e.g. in Hz) and may be determined as follows:

$$\varphi_e = 2\pi \cdot f_{error} \cdot \Delta t \quad (7)$$

Therefore, method 100 further comprises modifying the values indicating the phase differences based on the synchronization error $f_{error}$ of the modulation frequency of the modulated reference signal with respect to the modulation frequency of the modulated light signal 231 emitted by the object 230. That is, compensated (synchronization error corrected) values indicating the phase differences are obtained so that the phase drift caused by the synchronization error $f_{error}$ may be compensated (corrected) after each measurement (for obtaining a set of raw images).

The information about relative motion between the ToF camera 200 and the object 230 is accordingly determined based on the compensated values.

Synchronizing the modulation frequency of the modulated reference signal to the modulation frequency of the modulated light signal 231 emitted by the object 230 may be done in many different ways. In the following, some exemplary options for synchronization will be described. However, the proposed technique is not restricted to the following examples.

In some examples, the modulation frequency of the modulated reference signal may be synchronized with the modulation frequency of the modulated light signal 231 emitted by the object 230 according to method described in document DE 10 2017 105 142 A1 which is hereby incorporated by reference.

For example, method 100 may comprise controlling the ToF camera 200 to synchronize the modulation frequency of the modulated reference signal to a Radio Frequency (RF) signal receivable by the ToF camera 200 and the object 230. In other words, both systems may synchronize their reference frequencies to the phase of a commonly available RF signal such as a mobile communications signal (e.g. according to a 3rd Generation Partnership Project, 3GPP, standard) a Global Navigation Satellite System (GNSS) signal such as a Global Positioning System (GPS) signal.

Alternatively, the ToF camera 200 may provide an RF synchronization signal to the object 230, or vice versa. That is, method 100 may, in some examples, comprise controlling the ToF camera 200 to synchronize the modulation frequency of the modulated reference signal to a RF reference signal, and controlling the ToF camera 200 to transmit the RF reference signal to the object 230. In other examples, method 100 may comprise controlling the ToF camera 200 to receive a RF reference signal from the object 230, and controlling the ToF camera 200 to synchronize the modulation frequency of the modulated reference signal to the received RF reference signal.

An exemplary technique for measuring the synchronization error $f_{error}$ of the modulation frequency of the modulated reference signal is described in the following. However, it is to be noted that method 100 is not limited to this technique.

Method 100 may further comprise determining the synchronization error $f_{error}$ of the modulation frequency of the modulated reference signal based on a first auxiliary set of raw images of the scene. The raw images of the first auxiliary set of raw images are captured using the same modulated reference signal (i.e. a constant reference phase for the pixels of the light capturing element). Respective first signal strengths for the modulated light signal 231 emitted by the object 230 are determined in the individual raw images of the first auxiliary set of raw images. Further, a first waveform is determined using the respective first signal strengths for the modulated light signal 231 as samples of the first waveform. In other words, the average signal value of the light source 230 is extracted from each image of the first auxiliary set of raw images and used as a sample to estimate the synchronization error $f_{error}$. That is, the average signal of the object 230 on the pixel array of the light capturing element 220 is put into a waveform. Further, determining the synchronization error $f_{error}$ comprises determining a frequency of the first waveform as the synchronization error $f_{error}$ of the modulation frequency of the modulated reference signal 231. In other words, the frequency of the waveform determined by average signal values of the object 230 is the synchronization error $f_{error}$.

To increase the sample rate, only a sub-image may be sampled by the ToF camera 200. In other words, each raw image of the first auxiliary set of raw images may comprise less pixels than the raw images of the first and/or second set of raw images used for determining the relative motion.

For determining whether the synchronization error $f_{error}$ exhibits a positive or a negative sign, the frequency of the modulated reference signal is changed by a predetermined positive frequency step and another series of raw images may be captured.

In other words, determining the synchronization error $f_{error}$ further comprises determining respective second signal strengths for the modulated light signal 231 in the individual raw images of a second auxiliary set of raw images of the scene. The raw images of the first and second auxiliary sets of raw images are based on correlations of measurement signals of the ToF camera with two different modulated reference signals which exhibit different modulation frequencies. Further, determining the synchronization error $f_{error}$ comprises determining a second waveform using the respective second signal strengths for the modulated light signal as samples of the second waveform, and determining a frequency of the second waveform. A sign of the synchronization error $f_{error}$ of the modulation frequency of the modulated reference signal is determined based on a comparison of the frequencies of the first waveform and the second waveform. For example, if the frequency of the second waveform is higher than the frequency of the first waveform, the sign of the synchronization error $f_{error}$ may be determined as positive, and vice versa.

Once the sign of the synchronization error $f_{error}$ is determined, the modulated reference signal may be reset to the original frequency.

Method 100 may further be used to extrapolate a known absolute distance between the ToF camera 200 and the object 230. For example, method 100 may further comprise receiving information about an absolute distance between the ToF camera 200 and the object 230. Method 100 may comprise updating the information about an absolute distance between the ToF camera 200 and the object 230 based on the determined information about relative motion between the ToF camera 200 and the object 230.

For example, the object may transmit the information about the absolute distance between the ToF camera 200 and the object 230 to the ToF camera 200. Alternatively, an element comprising/holding the ToF camera 200 may transmit the information about an absolute distance between the ToF camera 200 and the object 230 to the ToF camera 200. The information may, e.g., be transmitted to the ToF camera using RF communication or optical communication. In some examples, the information about the absolute distance between the ToF camera 200 and the object 230 may be encoded into the modulated light signal emitted by the object 230. In other words, the relative motion determination may be combined with optical communication. For example, the modulated light signal 231 emitted by the object 230 may be modulated with the information about the absolute distance between the ToF camera 200 and the object 230 by means of Phase-Shift Keying (PSK). The ToF camera 200 is able to observe the phase differences used for determining the relative motion in PSK modulated optical signals.

Alternatively, the information about the absolute distance between the ToF camera 200 and the object 230 may be determined by the ToF camera 200 itself using conventional ToF depth sensing. Therefore, in some examples, method 100 may comprise controlling the ToF camera 200 to determine the information about the absolute distance between the ToF camera 200 and the object 230 by illuminating the scene (using the modulated reference signal). Accordingly, the information about the absolute distance between the ToF camera 200 and the object 230 is again updated based on the information about the absolute distance between the ToF camera 200 and the object 230. The ToF camera 200 is controlled to illuminate the scene while the object 230 pauses emitting the modulated light signal 231 so that the conventional ToF depth measurement is not influenced/disturbed by the modulated light signal 231. In other words, the cooperative object 230 pauses its modulated light signal 231 for, e.g., certain intervals to allow the ToF camera 200 to measure the absolute distance. After the absolute distance is determined, the relative measurements may be used to extrapolate the absolute distance. Accordingly, the amount of light emitted by the ToF camera 200 may be reduced.

The proposed technique may, e.g., be used between vehicles in traffic as a redundant high frequency distance estimator. Further, the proposed technique may be used in a control loop for regulating the distance between the vehicles. If the proposed system is only synchronized by the ToF sensor synchronization methods as described above, both speed and distance are relative to the beginning of the proposed phase tracking procedure. In a vehicle to vehicle communication, the active illumination of one of the vehicles may therefore transmit its current speed or distance via the emitted light(pulses). If the other car is within the range of the other vehicle's ToF camera, the ToF camera of the other vehicle may conduct reference depth measurements to derive the absolute speed or distance of the vehicle and extrapolate it according to the proposed technique.

Further, the proposed technique may, e.g., be used for motion tracking or indoor localization systems. The proposed technique may allow to extrapolate absolute measurements by relative measurements so that high localization update rates may be achieved.

Since the proposed method also tracks the two-dimensional position of the object 230, a vector may be determined and output that points into the direction of the current object movement. If the object 230 is localized in three dimensions, the motion of the object 230 may be predicted.

Figure 4:
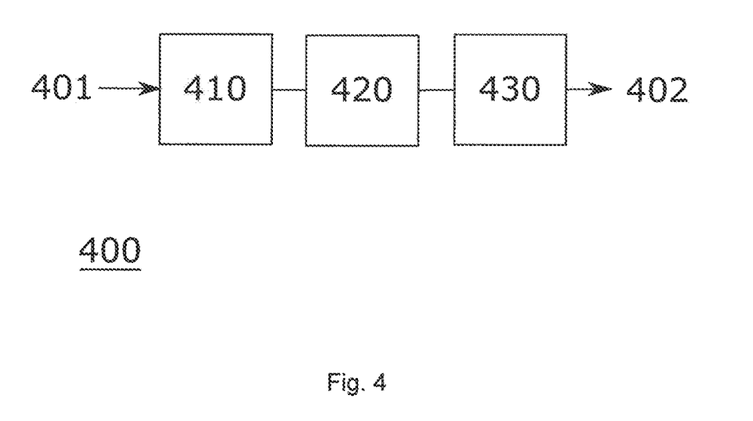
FIG. 4 illustrates an example of an apparatus for determining relative motion between a ToF camera and an object in a scene sensed by the ToF camera.

An example of an apparatus 400 determining relative motion between a ToF camera and an object in a scene sensed by the ToF camera according to the proposed concept is further illustrated in FIG. 4. The apparatus 400 comprises a processing circuit 420. For example, the processing circuit 420 may be a single dedicated processor, a single shared processor, or a plurality of individual processors, some of which or all of which may be shared, a digital signal processor (DSP) hardware, an application specific integrated circuit (ASIC) or a field programmable gate array (FPGA). The processing circuit 420 may optionally be coupled to, e.g., read only memory (ROM) for storing software, random access memory (RAM) and/or non-volatile memory. The apparatus 400 may further comprise other hardware—conventional and/or custom.

The apparatus 400 comprises an input circuit 410 configured to receive input data 401 representing the at least two sets of raw images of the scene from the ToF camera. The processing circuit 420 processes the input data 401 according to the above described concept for determining relative motion between the ToF camera and the object. Accordingly, an output circuit 430 of the apparatus outputs output data 402 representing the information about relative motion between the ToF camera and the object.

For example, the functionalities of apparatus 400 may be implemented in an application processor coupled to a ToF camera module providing the at least two sets of raw images or in the ToF camera module itself.

The examples as described herein may be summarized as follows:

Some examples relate to a method for determining relative motion between a ToF camera and an object in a scene sensed by the ToF camera. The object emits a modulated light signal. The method comprises receiving at least two sets of raw images of the scene from the ToF camera. The at least two sets of raw images each comprise at least one raw image. The raw images are based on correlations of a modulated reference signal and measurement signals of the ToF camera. The measurement signals are based on the modulated light signal emitted by the object. Further, the method comprises determining for each set of raw images a value indicating a respective phase difference between the modulated light signal and the modulated reference signal based on the respective set of raw images. The method additionally comprises determining information about relative motion between the ToF camera and the object based on the values indicating the phase differences. Further, the method comprises outputting the information about relative motion between the ToF camera and the object.

In some examples, the method further comprises controlling the ToF camera to synchronize a modulation frequency of the modulated reference signal to a modulation frequency of the modulated light signal emitted by the object. Additionally, the method comprises modifying the values indicating the phase differences based on a synchronization error of the modulation frequency of the modulated reference signal to obtain compensated values. The information about relative motion between the ToF camera and the object is determined based on the compensated values.

According to some examples, controlling the ToF camera to synchronize the modulation frequency of the modulated reference signal to the modulation frequency of the modulated light signal emitted by the object comprises controlling the ToF camera to synchronize the modulation frequency of the modulated reference signal to a RF signal receivable by the ToF camera and the object.

In some examples, controlling the ToF camera to synchronize the modulation frequency of the modulated reference signal to the modulation frequency of the modulated light signal emitted by the object comprises: controlling the ToF camera to synchronize the modulation frequency of the modulated reference signal to a RF reference signal; and controlling the ToF camera to transmit the RF reference signal to the object.

According to some examples, controlling the ToF camera to synchronize the modulation frequency of the modulated reference signal to the modulation frequency of the modulated light signal emitted by the object comprises: controlling the ToF camera to receive a RF reference signal from the object; and controlling the ToF camera to synchronize the modulation frequency of the modulated reference signal to the RF reference signal.

In some examples, the method further comprises determining the synchronization error of the modulation frequency of the modulated reference signal based on a first auxiliary set of raw images of the scene.

According to some examples, determining the synchronization error of the modulation frequency of the modulated reference signal comprises: determining respective first signal strengths for the modulated light signal in the individual raw images of the first auxiliary set of raw images; determining a first waveform using the respective first signal strengths for the modulated light signal as samples of the first waveform; and determining a frequency of the first waveform as the synchronization error of the modulation frequency of the modulated reference signal.

In some examples, determining the synchronization error of the modulation frequency of the modulated reference signal further comprises: determining respective second signal strengths for the modulated light signal in the individual raw images of a second auxiliary set of raw images of the scene, wherein the raw images of the first and second auxiliary sets of raw images are based on correlations of measurement signals of the ToF camera with two different modulated reference signals; determining a second waveform using the respective second signal strengths for the modulated light signal as samples of the second waveform; determining a frequency of the second waveform; and determining a sign of the synchronization error of the modulation frequency of the modulated reference signal based on a comparison of the frequencies of the first waveform and the second waveform.

The two different modulated reference signals exhibit, according to some examples, different modulation frequencies.

In some examples, the method further comprises: receiving information about an absolute distance between the ToF camera and the object; and updating the information about an absolute distance between the ToF camera and the object based on the information about relative motion between the ToF camera and the object.

According to some examples, the information about the absolute distance between the ToF camera and the object is encoded into the modulated light signal emitted by the object.

In some examples, the method further comprises: controlling the ToF camera to determine information about an absolute distance between the ToF camera and the object by illuminating the scene; and updating the information about the absolute distance between the ToF camera and the object based on the information about relative motion between the ToF camera and the object.

According to some examples, the ToF camera is controlled to illuminate the scene while the object pauses emitting the modulated light signal.

In some examples, the information about relative motion between the ToF camera and the object indicates at least one of a relative distance change or a relative speed between the ToF camera and the object.

Another example relates to an apparatus for determining relative motion between a ToF camera and an object in a scene sensed by the ToF camera. The object emits a modulated light signal. The apparatus comprises an input circuit configured to receive multiple sets of raw images of the scene from the ToF camera. The at least two sets of raw images each comprise at least one raw image. The raw images are based on correlations of a modulated reference signal and measurement signals of the ToF camera. The measurement signals are based on the modulated light signal emitted by the object. The apparatus additionally comprises a processing circuit configured to determine for each set of raw images a value indicating a respective phase difference between the modulated light signal and the modulated reference signal based on the respective set of raw images. The processing circuit is additionally configured to determine information about relative motion between the ToF camera and the object based on the values indicating the phase differences. Further, the apparatus comprises an output circuit configured to output the information about relative motion between the ToF camera and the object.

Further examples relate to another apparatus for determining relative motion between a ToF camera and an object in a scene sensed by the ToF camera. The object emits a modulated light signal. The apparatus comprises means for receiving multiple sets of raw images of the scene from the ToF camera. The at least two sets of raw images each comprise at least one raw image. The raw images are based on correlations of a modulated reference signal and measurement signals of the ToF camera. The measurement signals are based on the modulated light signal emitted by the object. Further, the apparatus comprises means for determining for each set of raw images a value indicating a respective phase difference between the modulated light signal and the modulated reference signal based on the respective set of raw images. The apparatus additionally comprises means for determining information about relative motion between the ToF camera and the object based on the values indicating the phase differences. Further, the apparatus comprises means for outputting the information about relative motion between the ToF camera and the object.

Examples relate to a non-transitory machine readable medium having stored thereon a program having a program code for performing the method for determining relative motion between a ToF camera and an object in a scene sensed by the ToF camera as described herein, when the program is executed on a processor or a programmable hardware.

Other examples relate to a program having a program code for performing the method for determining relative motion between a ToF camera and an object in a scene sensed by the ToF camera as described herein, when the program is executed on a processor or a programmable hardware.

Examples according to the proposed concept may allow to measure the relative distance to a modulated light source with ToF sensors. Using the modulated light source as object may allow to capture relative distance changes at longer distance ranges with higher sample rates for the ToF sensors.

The description and drawings merely illustrate the principles of the disclosure. Furthermore, all examples recited herein are principally intended expressly to be only for illustrative purposes to aid the reader in understanding the principles of the disclosure and the concepts contributed by the inventor(s) to furthering the art. All statements herein reciting principles, aspects, and examples of the disclosure, as well as specific examples thereof, are intended to encompass equivalents thereof.

A block diagram may, for instance, illustrate a high-level circuit diagram implementing the principles of the disclosure. Similarly, a flow chart, a flow diagram, a state transition diagram, a pseudo code, and the like may represent various processes, operations or steps, which may, for instance, be substantially represented in computer readable medium and so executed by a computer or processor, whether or not such computer or processor is explicitly shown. Methods disclosed in the specification or in the claims may be implemented by a device having means for performing each of the respective acts of these methods.

It is to be understood that the disclosure of multiple acts, processes, operations, steps or functions disclosed in the specification or claims may not be construed as to be within the specific order, unless explicitly or implicitly stated otherwise, for instance for technical reasons. Therefore, the disclosure of multiple acts or functions will not limit these to a particular order unless such acts or functions are not interchangeable for technical reasons. Furthermore, in some examples a single act, function, process, operation or step may include or may be broken into multiple sub-acts, -functions, -processes, -operations or -steps, respectively. Such sub acts may be included and part of the disclosure of this single act unless explicitly excluded.

Furthermore, the following claims are hereby incorporated into the detailed description, where each claim may stand on its own as a separate example. While each claim may stand on its own as a separate example, it is to be noted that—although a dependent claim may refer in the claims to a specific combination with one or more other claims other examples may also include a combination of the dependent claim with the subject matter of each other dependent or independent claim. Such combinations are explicitly proposed herein unless it is stated that a specific combination is not intended. Furthermore, it is intended to include also features of a claim to any other independent claim even if this claim is not directly made dependent to the independent claim.

What is claimed is:

1. A method for determining relative motion between a time-of-flight camera and an object in a scene sensed by the time-of-flight camera, wherein the object emits a modulated light signal, the method comprising:
   receiving at least two sets of raw images of the scene from the time-of-flight camera, wherein the at least two sets of raw images each comprise at least one raw image, wherein the raw images are based on correlations of a modulated reference signal and measurement signals of the time-of-flight camera, and wherein the measurement signals are based on the modulated light signal emitted by the object;
   determining, for each set of raw images, a value indicating a respective phase difference between the modulated light signal and the modulated reference signal based on the respective set of raw images;
   determining information about relative motion between the time-of-flight camera and the object based on the values indicating the phase differences;
   outputting the information about relative motion between the time-of-flight camera and the object;
   controlling the time-of-flight camera to synchronize a modulation frequency of the modulated reference signal to a modulation frequency of the modulated light signal emitted by the object; and
   modifying the values indicating the phase differences based on a synchronization error of the modulation frequency of the modulated reference signal to obtain compensated values, wherein the information about relative motion between the time-of-flight camera and the object is determined based on the compensated values.

2. The method of claim 1, wherein controlling the time-of-flight camera to synchronize the modulation frequency of the modulated reference signal to the modulation frequency of the modulated light signal emitted by the object comprises controlling the time-of-flight camera to synchronize the modulation frequency of the modulated reference signal to a radio frequency signal receivable by the time-of-flight camera and the object.

3. The method of claim 1, wherein controlling the time-of-flight camera to synchronize the modulation frequency of the modulated reference signal to the modulation frequency of the modulated light signal emitted by the object comprises:
   controlling the time-of-flight camera to synchronize the modulation frequency of the modulated reference signal to a radio frequency reference signal; and
   controlling the time-of-flight camera to transmit the radio frequency reference signal to the object.

4. The method of claim 1, wherein controlling the time-of-flight camera to synchronize the modulation frequency of the modulated reference signal to the modulation frequency of the modulated light signal emitted by the object comprises:
   controlling the time-of-flight camera to receive a radio frequency reference signal from the object; and
   controlling the time-of-flight camera to synchronize the modulation frequency of the modulated reference signal to the radio frequency reference signal.

5. The method of claim 1, further comprising:
   determining the synchronization error of the modulation frequency of the modulated reference signal based on a first auxiliary set of raw images of the scene.

6. The method of claim 5, wherein determining the synchronization error of the modulation frequency of the modulated reference signal comprises:
   determining respective first signal strengths for the modulated light signal in the individual raw images of the first auxiliary set of raw images;
   determining a first waveform using the respective first signal strengths for the modulated light signal as samples of the first waveform; and
   determining a frequency of the first waveform as the synchronization error of the modulation frequency of the modulated reference signal.

7. The method of claim 6, wherein determining the synchronization error of the modulation frequency of the modulated reference signal further comprises:
   determining respective second signal strengths for the modulated light signal in the individual raw images of a second auxiliary set of raw images of the scene, wherein the raw images of the first and second auxiliary sets of raw images are based on correlations of measurement signals of the time-of-flight camera with two different modulated reference signals;

determining a second waveform using the respective second signal strengths for the modulated light signal as samples of the second waveform;

determining a frequency of the second waveform; and determining a sign of the synchronization error of the modulation frequency of the modulated reference signal based on a comparison of the frequencies of the first waveform and the second waveform.

8. The method of claim 7, wherein the two different modulated reference signals exhibit different modulation frequencies.

9. The method of claim 1, further comprising:

receiving information about an absolute distance between the time-of-flight camera and the object; and updating the information about an absolute distance between the time-of-flight camera and the object based on the information about relative motion between the time-of-flight camera and the object.

10. The method of claim 9, wherein the information about the absolute distance between the time-of-flight camera and the object is encoded into the modulated light signal emitted by the object.

11. The method of claim 1, further comprising:

controlling the time-of-flight camera to determine information about an absolute distance between the time-of-flight camera and the object by illuminating the scene; and updating the information about the absolute distance between the time-of-flight camera and the object based on the information about relative motion between the time-of-flight camera and the object.

12. The method of claim 11, wherein the time-of-flight camera is controlled to illuminate the scene while the object pauses emitting the modulated light signal.

13. The method of claim 1, wherein the information about relative motion between the time-of-flight camera and the object indicates at least one of a relative distance change or a relative speed between the time-of-flight camera and the object.

* * * * *